United States Patent [19]

Yokoyama et al.

[11] Patent Number: 4,622,288

[45] Date of Patent: Nov. 11, 1986

[54] PHOTOGRAPHIC LIGHT-SENSITIVE MATERIAL HAVING IMPROVED ANTISTATICITY

[75] Inventors: Shigeki Yokoyama; Junichi Yamanouchi; Masakazu Yoneyama; Yukio Maekawa, all of Kanagawa, Japan

[73] Assignee: Fuji Photo Film Co., Ltd., Kanagawa, Japan

[21] Appl. No.: 710,257

[22] Filed: Mar. 11, 1985

[30] Foreign Application Priority Data

Mar. 9, 1984 [JP] Japan .................................. 59-44973

[51] Int. Cl.$^4$ .............................................. G03C 1/82
[52] U.S. Cl. ...................................... 430/527; 430/631
[58] Field of Search ................................ 430/527, 631

[56] References Cited

U.S. PATENT DOCUMENTS

| | | | |
|---|---|---|---|
| 3,753,716 | 8/1973 | Ishihara et al. | 430/527 |
| 4,229,526 | 10/1980 | Yoneyama et al. | 430/527 |
| 4,266,015 | 5/1981 | Bulter et al. | 430/526 |
| 4,366,138 | 12/1982 | Yoneyama et al. | 430/527 |
| 4,495,275 | 7/1985 | Yokoyama et al. | 430/527 |

*Primary Examiner*—Jack P. Brammer
*Attorney, Agent, or Firm*—Sughrue, Mion, Zinn Macpeak & Seas

[57] ABSTRACT

A photographic light-sensitive material containing a fluorine-containing graft polymer is disclosed. The graft polymer is derived from a polymerizable hydrophobic fluorine-containing monomer containing at least one fluorine atom and a polymerizable hydrophilic monomer, and optionally, a third polymerizable hydrophobic monomer containing no fluorine atom. The material has an improved antistaticity.

12 Claims, No Drawings

PHOTOGRAPHIC LIGHT-SENSITIVE MATERIAL HAVING IMPROVED ANTISTATICITY

FIELD OF THE INVENTION

This invention relates to a photographic light-sensitive material and, more particularly, to a photographic light-sensitive material having improved antistaticity.

BACKGROUND OF THE INVENTION

Since photographic light-sensitive materials generally comprise a support and photographic layers having an electric insulating property, it is likely that static electricity is accumulated in the light-sensitive materials due to contact friction between them or with other substances or by peeling during the production of the light-sensitive materials or upon use. The accumulated static charge induces many disturbances, the most serious of which is exposure of the light-sensitive emulsion layer to the electrostatic charge discharged before development processing to cause dot-like, arborescent or feathery blackening called static marks when the photographic films are developed. Such static marks significantly depress or sometimes destroy the commercial value of the photographic films. For example, static marks appearing in photographic films for medical use or in industrial X-ray films can lead to an inacurate diagnosis. This phenomenon is one of the most troublesome problems since it does not present itself until development processing. Further, the accumulated static charge causes secondary disorders, such as adhesion of dust onto the film surface, uneven coating and the like.

As described above, electrostatic charge is frequently accumulated during the production of photographic light-sensitive materials or at the time of use. For example, static electricity is generated by contact friction between photographic films and rollers during the production of the films, separation between the emulsion side and the support side during winding or rewinding of the films, and the like. It is also generated by contact or separation of X-ray films with or from machanical parts of an automatic X-ray camera or a fluorescent intensifying screen. Further, abrasion with wrapping materials also causes generation of static charge. Static marks of the photographic light-sensitive material induced by accumulation of such static charge become conspicuous with an increase of sensitivity and processing speed of the light-sensitive material. In particular, with the recent development of high sensitivity, rapid coating, high speed photography, rapid automatic processing, and the like, photographic light-sensitive materials receive severe handlings on increasing occations so that they easily undergo generation of static marks.

In order to eliminate these problems ascribed to static electricity, it is desirable to add an antistatic agent to the photographic light-sensitive material. However, antistatic agents commonly employed in other fields cannot be applied as such to photographic light-sensitive materials because of various limitations inherent to photographic light-sensitive materials. In other words, antistatic agents applicable to photographic light-sensitive materials should meet various requirements such that: photographic properties, such as sensitivity, fog, graininess, sharpness and the like is not adversely affected; film strength is not impaired, i.e., the film surface is not made susceptible to scratches; adhesion resistance of the film surface is not lessened, i.e., the adhesion of the light-sensitive materials among themselves or to other substances is not induced; fatigue of a processing solution is not accelerated; adhesion strength between layers constituting the light-sensitive materials is not reduced; and the like. Therefore, application of conventional antistatic agents to photographic light-sensitive materials have many restrictions.

Another solution to eliminate problems due to static electricity comprises increasing the electric conductivity of the surface of the light-sensitive materials so that the static charge may be scattered in a short time before the accumulated charge is discharged.

To this effect, there had been attempts at improving the conductivity supports or various coating surface layers of photographic light-sensitive materials, and the use of various hygroscopic substances or water-soluble inorganic salts, a certain kind of surface active agents, polymers, and the like has been proposed. Examples of these compounds include polymers as disclosed, e.g., in U.S. Pat. Nos. 2,882,157, 2,972,535, 3,062,785, 3,262,807, 3,514,291, 3,615,531, 3,753,716 and 3,938,999, etc.; surface active agents as disclosed, e.g., in U.S. Pat. Nos. 2,982,651, 3,428,456, 3,457,076, 3,454,625, 3,552,972 and 3,655,387, etc.; metal oxides and colloidal silica as disclosed, e.g., in U.S. Pat. Nos. 3,062,700, 3,245,833 and 3,525,621, etc.; and the like.

These numerous compounds, however, show specificity depending upon the type of supports or photographic compositions. In other words, they may afford satisfactory results to specific film supports, photographic emulsions or other photographic elements, but do not serve the purpose of preventing static charge for other supports or photographic emulsions and, in some cases, even adversely affect the photographic properties of the light-sensitive material.

Further, some of them cannot be employed because of adverse influences on the photographic properties, such as sensitivity, fog, graininess, sharpness, and the like, despite of their remarkable effect to prevent static charge. For example, polyethylene oxide type compounds are generally known to have an antistatic effect but frequently exert unfavorable influences on photographic properties, such as increase of fog, desensitization, deterioration of graininess, etc. It has been particularly difficult to establish a technique for effectively imparting antistaticity to light-sensitive materials having coated a photographic emulsion on both sides of their support, such as direct X-ray films for medical use. Thus, application of known antistatic agents to photographic light-sensitive materials is very difficult and is restricted within narrow limits.

Still another solution for overcoming problems due to static electricity comprises controlling the voltage charged on the surface of the light-sensitive material so as to lessen the generation of static electricity due to friction or contact.

To this effect, application of fluorine-containing surface active agents to photographic light-sensitive materials has been attempted as described, e.g., in British Pat. Nos. 1,330,356 and 1,524,631, U.S. Pat. Nos. 3,666,478 and 3,589,906, Japanese Patent Publication No. 26687/77, Japanese Patent Application (OPI) Nos. 46733/74 and 32322/76 (the term "OPI" herein used means "unexamined published application"), etc. However, since the static electricity characteristic of the photograhic light-sensitive materials containing these fluorine-containing surface active agents makes use of the properties of the surface active agents, such as the monomolecular layer-forming property, it is greatly dependent on the production conditions of the light-sensitive materials. Thus, it is very difficult to stably produce uniform products having constant static electricity characteristics. For example, the static electricity characteristic the products widely varies depending on the temperature and humidity during a coating step of the layers on a support, the temperature, humidity and drying time of a drying step after coating, and the like. As a result, some products have satisfactory performances while some products are considerably inferior in static electricity characteristic, thus giving rise to a serious barrier to maintenance of quality. Further, these fluorine-containing surface active agents are also disadvantageous in that even if the products have a satisfactory static electricity characteristic immediately after preparation, such a quality is gradually deteriorated with the passage of time only to exhibit no satisfactory static electricity characteristic any longer at the time of use.

In order to overcome the above-described disadvantages of the fluorine-containing surface active agents, an attempt to use a fluorine-containing polymer in the photographic light-sensitive materials, particularly in the surface layer thereof, has been made. Examples of such a polymer include an emulsion (latex) of a homopolymer of an acrylic ester or methacrylic ester of a fluorine-containing alcohol or a copolymer of said fluorine-containing monomer with other monomers as disclosed in U.S. Pat. No. 4,266,015; a copolymer comprising the above-described fluorine-containing monomer and a monomer having a polyethylene oxide chain as disclosed in U.S. Pat. No. 4,299,524; a polymer comprising the above-described fluorine-containing monomer or other fluorine-containing monomer, e.g., a vinyl ester of a fluorine-containing carboxylic acid, a fluorine-containing vinyl ether, a fluorine-substituted olefin, etc., and a monomer containing a quaternary nitrogen atom as disclosed in Japanese Patent Publication No. 15376/82 (British Pat. No. 1,535,685); a ternary copolymer comprising a melic ester of a fluorine-containing alcohol, maleic acid and another monomer as disclosed in U.S. Pat. No. 3,753,716.

When these fluorine-containing polymers are applied to photographic light-sensitive materials, the charged voltage of the surface of the materials can be controlled to some extent to thereby lessen generation of static electricity against the above-mentioned friction or contact to some extent. Further, use of these polymers can eliminate, to a certain extent, the above-described disadvantage associated with the fluorine-containing surface active agents, i.e., the great dependence of the static electricity characteristic upon production conditions and deterioration of the static electricity characteristic with the passage of time. Nevertheless, the photographic light-sensitive materials containing these fluorine-containing polymers are still insufficient in the above-described electric charging characteristic and also disadvantageous with respect to photographic properties or film properties that are important for photographic light-sensitive materials. These disadvantages significantly diminish the commercial value of products and, therefore, these polymers cannot be practically utilized for photographic light-sensitive materials.

More specifically, a photographic layer containing the emulsion of the fluorine-containing polymer as disclosed in U.S. Pat. No. 4,266,015 is highly adhesive and easily sticks to other emulsion layers or backing layers, resulting in the failure to separate from each other or appreciable traces are left after separation. In addition, the layer containing such a polymer is easily scratched by friction with other substances. These disadvantages seriously detract from the commercial value of products. On the other hand, the fluorine-containing polymers disclosed in U.S. Pat. No. 4,299,524, Japanese Patent Publication No. 15376/83 (British Pat. No. 1,535,685) and U.S. Pat. Nos. 3,753,716, when incorporated in photographic light-sensitive materials, are significantly inferior in terms of the capacity to control the charged voltage and, therefore, should be incorporated in a large quantity to compensate therefor. This not only entails an increase of cost but also adversely affects the photographic properties, resulting in reduction of sensitivity, reduction of density and generation of fog, and, further, have unfavorable influences on the film properties, such as stickiness and susceptibility to scratches. Therefore, it has been impossible to apply these polymers to photographic light-sensitive materials.

As a solution to overcome the above-described disadvantages of fluorine-containing polymers, British Pat. No. 2,080,559 and U.S. Pat. No. 4,362,812 disclose the use of fluorine-containing polymers obtained by copolymerizing a hydrophobic fluorine-containing monomer which is a styrene derivative and a water-soluble monomer.

Incorporation of these fluorine-containing polymers in photographic light-sensitive materials makes it possible to control charged voltage with reduced amounts as compared with the aforesaid fluorine-containing polymers and, therefore, succeeds to reduce the cost of the products and lessen the unfavorable influences the photographic properties, such as decrease of sensitivity and density and generation of fog, or the film properties, such as stickiness or susceptibility to scratches.

The latest developments in increase of photographic sensitivity have led to high sensitivity photographic light-sensitive materials as exemplified by negative color films or reversal color films having ISO sensitivity of 1600. The photographic properties of these high sensitivity light-sensitive materials are so sensitive that they are sometimes widely varied by incorporation of even a slight amount of a different substance. Hence, if antistatic agents are used in these high sensitivity light-sensitive materials, they are required not only to be inactive to photographic emulsions but to produce effective antistatic activity in amounts as low as possible.

The above-described fluorine-containing polymers had succeeded in the realization of sufficient static charge prevention without adversely affecting the photographic properties as far as they are used in low sensitivity photographic light-sensitive materials, but cannot be applied any longer to the recently developed high sensitivity photographic light-sensitive materials for the reasons set forth above. That is, application of these fluorine-containing polymers to high sensitivity photographic light-sensitive materials is unavoidably accompanied with adverse influences on the photographic properties, such as reduction of sensitivity, reduction of density and generation of fog. Further, the rates of development processing have recently been increased so that the photographic light-sensitive materials are to be subjected to rapid development processing under severer conditions than before. In this situation, the photographic properties also become very sensitive as in the case of achievement of high sensitivity. Accordingly, antistatic agents to be used in photographic light-sensitive materials should not only be inactive to photographic emulsions but also exert effective antistatic activity in as low amounts as possible even under the above-described severe conditions. Therefore, the above-described fluorine-containing polymers are no longer employable in photographic light-sensitive materials because the materials, having been rendered antistatic by the incorporation of such polymers, suffer from deterioration of the photographic properties when subjected to rapid development processing.

Moreover, with the recent development of the rapid coating technique in the production of photographic light-sensitive materials, a high pressure is imposed on a coated surface of the light-sensitive materials primarily in the winding step of the coated materials. Therefore, the coated surfaces of the photographic light-sensitive materials are required to have high adhesion resistance to avoid sticking to each other.

As long as the production of light-sensitive materials is performed at a conventional speed, the surface of the materials receive only a weak pressure and, therefore, the above-described fluorine-containing polymers have been employable to attain sufficient adhesion resistance. However, realization of rapid coating has made these fluorine-containing polymers unemployable due to insufficient adhesion resistance against the high pressure applied on the coated surface.

The aforesaid fluorine-containing polymers belong to the so-called random copolvmers. Random copolymers generally comprise two or more monomers aligned at random, wherein mixing of different components takes place by monomer units so that homogeneous polymer compounds can easily be obtained, while mutual interaction between components and the like frequently result in the failure to produce polymers retaining the properties of respective monomers. Blended polymers obtained by merely blending different kinds of polymers undergo phase separation due to immiscibility among the polymers in many cases. On the other hand, graft polymers comprising a polymer chain composed of a certain monomer unit to which a polymer composed of a different monomer unit is grafted are free from phase separation as encountered in the case of blended polymers, and are characterized by micro-phase separation to have a multiphase structure since the two different polymers are chemically bonded. This is a conspicuous characteristic of graft polymers that can be achieved by neither random copolymers nor blended polymers. Graft polymers are also characterized by easiness to obtain surface orientation. For example, Yamashita et al., *Polymer Bulletin*, Vol. 7, 289-294 (1982) evaluated the surface orientation of a fluoroalkyl acrylate by adding a graft polymer composed of a fluoroalkyl acrylate as a main chain component and methyl methacrylate as a branch component to polymethyl methacrylate and determining a contact angle with water of a surface of a film prepared therefrom. According to their evaluation, the graft polymer composed of the fluoroalkyl acrylate and methyl methacrylate brings the surface orientation of the fluoroalkyl acrylate component in an amount about 1/10 of a random copolymer composed of these two components. Thus, graft polymers absolutely differ from random copolymers as having various characterisitcs that cannot possible be attained by random copolymers.

For details of various characteristics of graft polymers, additional reference can be made to Kobunshi Kagaku Kai (ed.), *Polymer Alloy*, Tokyo Kagaku Dojin, R. J. Ceresa (ed.), *Block and Graft Polymerization*, Vol. 1, John Willey & Sons (1973), and the like.

As a result of extensive investigations to overcome the above-described disadvantages associated with the conventional fluorine-containing random copolymers, the present inventors have noted graft polymers which completely eclipsed random copolymers in various aspects as discussed above, and it has now been found that a graft polymer derived from a hydrophobic fluorine-containing monomer and a hydrophilic monomer can eliminate every disadvantage of the aforesaid fluorine-containing random copolymers when used as an antistantic agent for photographic light-sensitive materials.

SUMMARY OF THE INVENTION

An object of this invention is to provide a photographic light-sensitive material having been rendered antistatic and thus suffering from less generation of static electricity.

Another object of this invention is to provide a photographic light-sensitive material having been rendered antistatic without any adverse influence on the photographic properties, such as sensitivity, density, fog, and the like, even having high sensitivity.

A further object of this invention is to provide a photographic light-sensitive material having been rendered antistatic without any adverse influence on the photographic properties even when processed under severe development processing conditions, such as rapid processing.

A still further object of this invention is to provide an antistatic photographic light-sensitive material, the surface of which has sufficient adhesion resistance even when a high pressure is applied thereon by high speed production and the like.

These objects of this invention can be accomplished by incorporating a fluorine-containing graft polymer derived from a polymerizable hydrophobic fluorine-containing monomer having at least one fluorine atom and a polymerizable hydrophilic monomer into at least one of layers constituting a photographic light-sensitive material.

DETAILED DESCRIPTION OF THE INVENTION

The fluorine-containing graft polymer which can be used in the present invention may have a third polymerizable hydrophobic monomer unit containing no fluorine atom.

The fluorine-containing graft polymer of the present invention preferably comprises a hydrophobic fluorine-containing monomer unit as a main chain component and a hydrophilic monomer unit as a branch component or vise versa.

More preferably, the fluorine-containing graft polymer according to the present invention has the following formula (I) or (II):

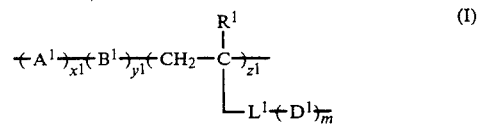

wherein $A^1$ represents a monomer unit formed by copolymerizing a copolymerizable hydrophobic fluorine-containing monomer having at least one fluorine atom and at least one ethylenically unsaturated group; $B^1$ represents a monomer unit formed by copolymerizing a copolymerizable hydrophobic monomer having no fluorine atom and having at least one ethylenically unsaturated group; $D^1$ represents a monomer unit formed by polymerizing a polymerizable hydrophilic monomer having at least one ethylenically unsaturated group; $L^1$ represents a divalent linking group; $R^1$ represents a hydrogen atom or an alkyl group having from 1 to 3 carbon atoms; m represents an average degree of polymerization of the hydrophilic monomer $D^1$ and ranges from 2 to about 1,000; and $x^1$, $y^1$ and $z^1$ represent percent ratios of copolymerization and range from 10 to 99.9 mol %, from 0 to 50 mol %, and from 0.1 to 80 mol %, respectively.

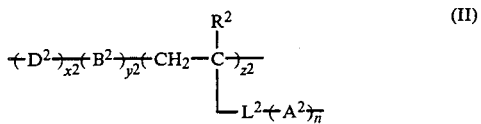
(II)

wherein $A^2$ represents a monomer unit formed by polymerizing a polymerizable hydrophobic fluorine-containing monomer having at least one fluorine atom and at least one ethylenically unsaturated group; $B^2$ represents a monomer unit formed by copolymerizing a copolymerizable hydrophobic monomer having no fluorine atom and at least one ethylenically unsaturated group; $L^2$ represents a divalent linking group; $D^2$ represents a monomer unit formed by polymerizing a polymerizable hydrophilic monomer having at least one ethylenically unsaturated group; $R^2$ represents a hydrogen atom or an alkyl group having from 1 to 3 carbon atoms; n represents an average degree of polymerization of a hydrophobic fluorine-containing monomer $A^2$ and ranges from 2 to about 1,000; and $x^2$, $y^2$ and $z^2$ represent percent ratios of copolymerization and range from 30 to 99.99 mol %, from 0 to 50 mol %, and from 0.01 to 20 mol %, respectively.

In the above-described formulae (I) and (II), the polymerizable hydrophobic monomer having at least one fluorine atom and at least one ethylenically unsaturated group as represented by $A^1$ or $A^2$ preferably includes the monomers represented by the following formulae (III), (IV), (V) and (VI):

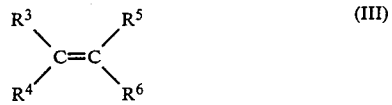
(III)

wherein $R^3$, $R^4$, $R^5$ and $R^6$, which may be the same or different, each represents a hydrogen atom, a fluorine atom, a chlorine atom, an alkyl group having from 1 to 3 carbon atoms, $-(CF_2)_p F$ group, wherein p represents an integer of from 1 to 10, a $-O-(CF_2)_p F$ group, wherein p represents an integer of from 2 to 10, a $-OCH_2-(CF_2)_p H$ group, wherein p represents an integer of from 2 to 10, a $-O-(CF_2)_p H$ group, wherein p represents an integer of from 2 to 10, a $-O-(CF_2)_p OC_6 F_5$ group, wherein p represents an integer of from 2 to 4, or a $-CF=CF_2$ group, with proviso that at least one of $R^3$, $R^4$, $R^5$ and $R^6$ contains a fluorine atom.

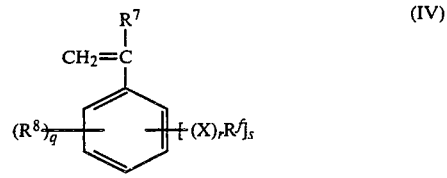
(IV)

wherein $R^7$ represents a hydrogen atom, a chlorine atom or an alkyl group having from 1 to 3 carbon atoms; $R^8$ represents a monovalent substituent; or a plurality of $R^8$ may be taken together to form a ring; $R^f$ represents an alkyl, aralkyl, aryl or alkylaryl group having from 1 to 30 carbon atoms, at least one hydrogen atom of which is substituted by a fluorine atom; X represents a divalent linking group represented by the formula $-(R-)_t L^3-$ or $-L^3-(R-)_t$, wherein R represents an alkylene, arylene or aralkylene group having from 1 to 10 carbon atoms, $-L^3-$ represents $-O-$, $-S-$, $-NH-$, $-CO-$, $-OCO-$, $-SCO-$, $-CONH-$, $-SO_2-$, $-NR^9SO_2-$, wherein $R^9$ represents a hydrogen atom or an alkyl group having from 1 to 4 carbon atoms, $-SO_2-NH-$, $-SO-$ or $-OPO_2-$, and t represents 0 or 1; q represents 0 or an integer of from 1 to 4, and preferably 0, 1 or 2; r represents 0 or an integer of from 1 to 4, and preferably 0 or 1; and s represents an integer of from 1 to 5, and preferably 1 or 2.

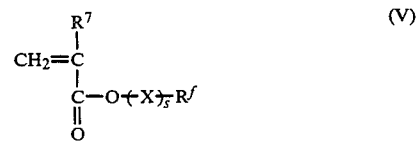
(V)

wherein $R^7$, X, $R^f$ and s are as defined in the formula (IV).

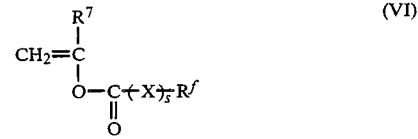
(VI)

wherein $R^7$, X, $R^f$ and s are as defined in the formula (IV).

In the above-described formulae (III) through (VI), $R^7$ preferably represents a hydrogen atom or a methyl group. $R^8$ includes, for example, a halogen atom, a nitro group, an amino group, an alkylamino group, a carboxyl group, a sulfonic acid group, a carboxylic ester group, a sulfonic ester group, a carbamoyl group, a sulfamoyl group, an alkylsulfonyl group, an alkoxyl group, a thioalkoxyl group, an alkyl group, an aryl group, and the like. These groups as represented by $R^8$ are further described, e.g., in Nihon Kagaku Kai (ed.), *Kagaku Binran Kiso-hen II*, 2nd Ed., 1012–1013 (1975) Maruzen K.K., Tseng Kuang-Chih, *Acta Chim. Sinica*, 32, 107 (1966), etc. Of these groups, $R^8$ preferably represents a halogen atom, a nitro group, an alkyl group, etc.

When q represents 2, 3 or 4, $R^8$ may be taken together to form a ring.

$R^f$ represents an alkyl, aralkyl, aryl or alkylaryl group having from 1 to 30, and preferably from 1 to 20, carbon atoms, at least one hydrogen atom of which is substituted by a fluorine atom. Of these groups, R$_f$ preferably represents a perfluoromethyl group, a perfluoroethyl group, a perfluoropropyl group, a perfluorohexyl group, a perfluorooctyl group, a 2,2,3,3-tetrafluoropropyl group, a 2,2,3,3,4,4,5,5-octafluoroamyl group, a 2,2,3,3,4,4,5,5,6,6,7,7-dodecafluoroheptyl group, a 2,2,2-trifluoroethyl group, a 2,2,3,3,4,4,4-heptafluorobutyl group, a 1,1,1,3,3,3-hexafluoro-2-propyl group, a 1,1,1,3,3,3-hexafluoro-2-hydroxyl-2-propyl group, a 1,1,2,2-tetrafluoro-2-hydroxyethyl group, a p-fluorophenyl group, a p-trifluoromethylphenyl group, a 2,3,4,5,6-pentatrifluoromethylphenyl group, and the like.

Specific examples of the monomers represented by the formulae (III) through (VI) are shown below:

| | |
|---|---|
| $CH_2=CHF$ | III-1 |
| $CH_2=CF_2$ | III-2 |
| $CHF=CF_2$ | III-3 |
| $CF_2=CF_2$ | III-4 |
| $CF_2=CFCl$ | III-5 |
| $CF_2=CF-CF_3$ | III-6 |
| $CF_2=CF-CF=CF_2$ | III-7 |
| $CF_2=CFO(CF_2)_6F$ | III-8 |
| $CF_2=CFO(CF_2)_8F$ | III-9 |
| $CH_2=CHOCH_2(CF_2)_6H$ | III-10 |
| $CH_2=CHOCH_2(CF_2)_8H$ | III-11 |
| $CF_2=CFO(CF_2)_3OC_6F_5$ | III-12 |

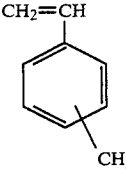
IV-1

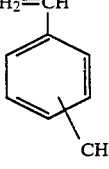
IV-2

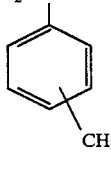
IV-3

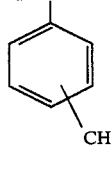
IV-4

—continued

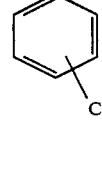

IV-5

IV-6

IV-7

IV-8

IV-9

IV-10

IV-11

-continued
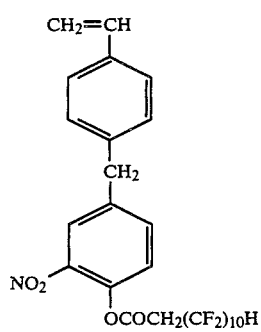
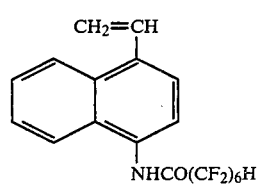
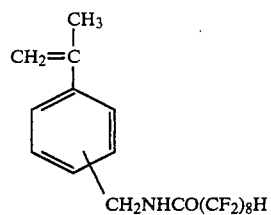
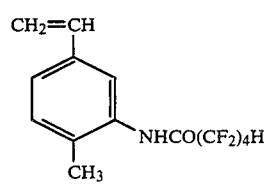
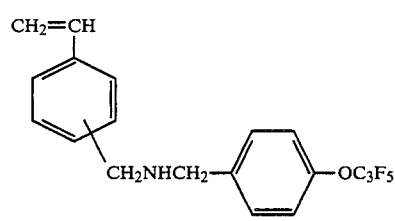
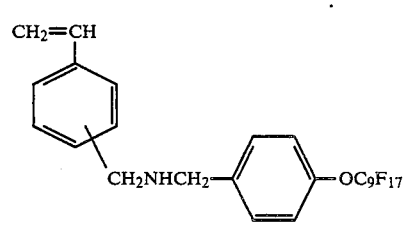
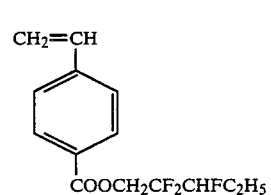
-continued
IV-12
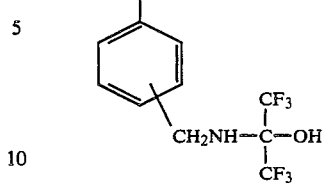
IV-13
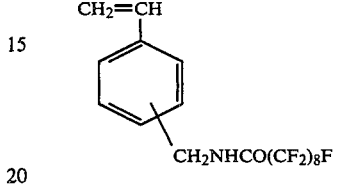
IV-14
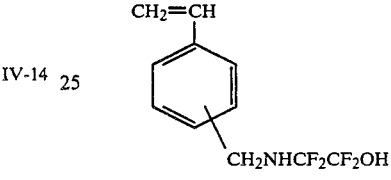
IV-15
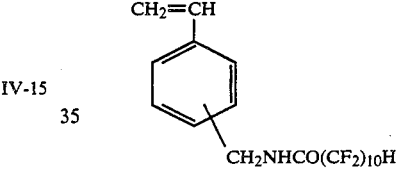
IV-16
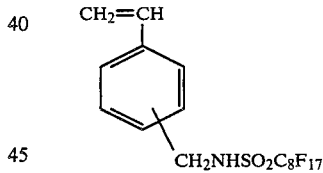
IV-17
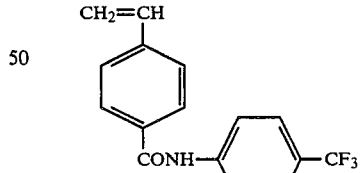
IV-18
IV-19
IV-20
IV-21
IV-22
IV-23
IV-24
IV-25
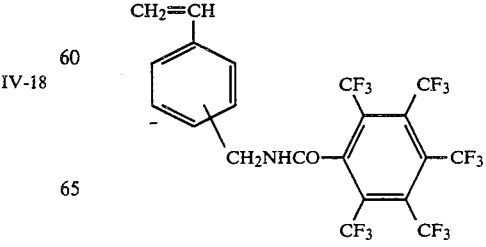

-continued

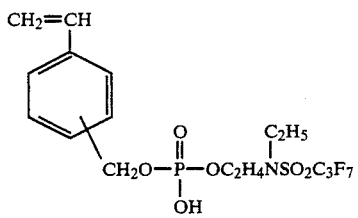

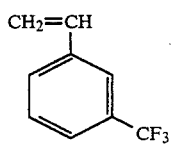

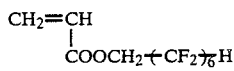

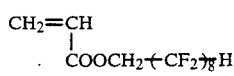

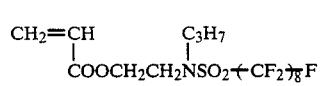

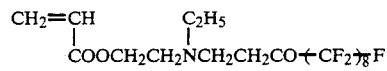

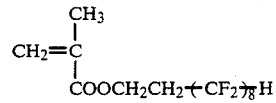

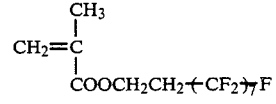

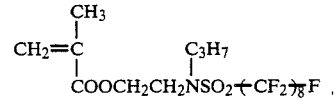

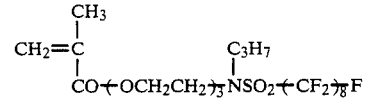

IV-26

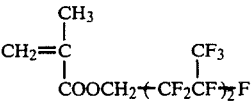 V-14

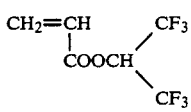 V-15

IV-27

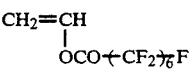 VI-1

V-1

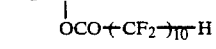 VI-2

V-2

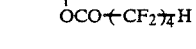 VI-3

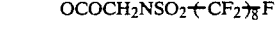 VI-4

V-3

 VI-5

V-4

In the formulae (I) and (II), the polymerizable hydrophilic monomer having at least one ethylenically unsaturated group as represented by $D^1$ or $D^2$ includes nonionic monomers, such as acrolein, acrylamide, methacrylamide, N-methylolacrylamide, N,N-dimethylaminoethylacrylamide, N,N-dimethylaminopropylacrylamide, hydroxyethyl methacrylate, N,N-dimethylaminoethyl acrylate, N,N-dimethylaminoethyl methacrylate, poly(ethyloxy) acrylate, poly(ethyloxy) methacrylate, 2-vinylpyridine, 4-vinylpyridine, 1-vinyl-2-pyrrolidone, 1-vinylimidazole, 1-vinyl-2-methylimidazole, etc.; cationic monomers, such as vinylbenzyltrimethylammonium salts, vinylbenzyltriethylammonium salts, vinylbenzyltripropylammonium salts, vinylbenzyldimethylamine hydrochloride, methacryloxyethyltrimethylammonium salt, methacryloxyethyldimethylethylammonium salts, N,N-dimethylaminoethyl methacrylate hydrochloride, etc.; anionic monomers, such as acrylic acid, methacrylic acid, maleic acid, styrenesulfonic acid, 2-acrylamido-2-methylpropanesulfonic acid, etc., and salts thereof; and amphoteric monomers shown below, but these specific examples are not limitative. Examples of Amphoteric Monomers:

V-5

V-6

V-7

V-8

V-9

V-10

V-11

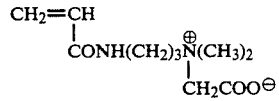

V-12

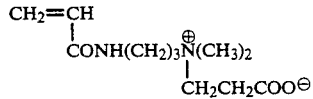

V-13

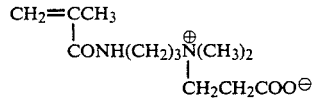

-continued

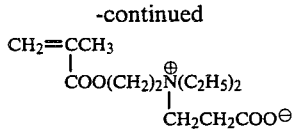

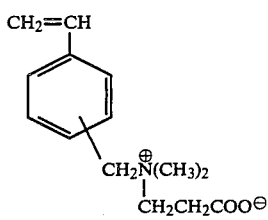

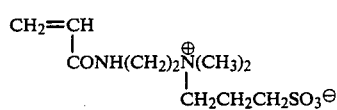

These amphoteric monomers are described, e.g., in U.S. Pat. No. 4,362,812.

In the formulae (I) and (II), the copolymerizable hydrophobic monomer containing no fluorine atom and containing at least one ethylenically unsaturated group as represented by $B^1$ or $B^2$ includes, for example, olefins, e.g., ethylene, propylene, 1-butene, etc.; styrene derivatives, e.g., styrene, α-methylstyrene, vinyltoluene, chloromethylstyrene, divinylbenzene, etc.; ethylenically unsaturated esters of organic acids, e.g., vinyl acetate, allyl acetate, etc.; ethylenically unsaturated carboxylic acid esters, e.g., methyl acrylate, methyl methacrylate, n-butyl acrylate, n-butyl methacrylate, benzyl acrylate, benzyl methacrylate, cyclohexyl acrylate, cyclohexyl methacrylate, 2-ethylhexyl acrylate, etc.; ethylenically unsaturated carboxylic acid amides, e.g., N-butyl acrylamide, N-amyl acrylamide, etc.; dienes, e.g., butadiene, isoprene, etc.; acrylonitrile; vinyl chloride; maleic anhydride; and the like, but these examples are not limitative.

Additional examples of $D^1$, $D^2$, $B^1$ and $B^2$ are described, e.g., in J. Brandrup, E. H. Immergut (eds.), *Polymer Handbook*, 2nd Ed., VII-1 to VII-11, John Wiley & Sons (1975).

In the formulae (I) and (II), $R^1$ and $R^2$ each preferably represents a hydrogen atom or a methyl group; m and n each preferably represents from 10 to 100; $x^1$, $y^1$ and $z^1$ preferably represent from 30 to 99 mol %, from 0 to 20 mol %, and from 1 to 50 mol %, respectively; and $x^2$, $y^2$ and $z^2$ preferably represent from 50 to 99.9 mol %, from 0 to 20 mol %, and from 0.05 to 10 mol %, respectively.

In the formulae (I) and (II), $L^1$ and $L^2$ specifically include, for example,

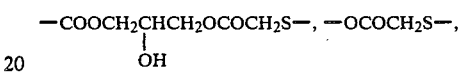

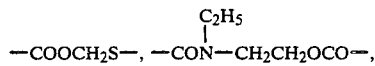

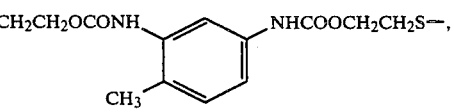

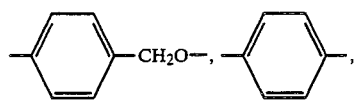

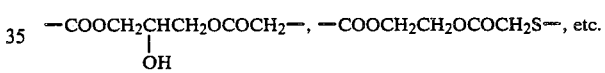

Specific examples of fluorine-containing graft polymers according to the present invention are shown below:

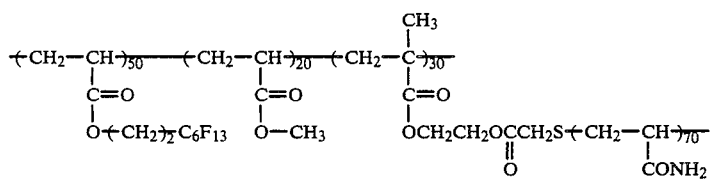

GP-1

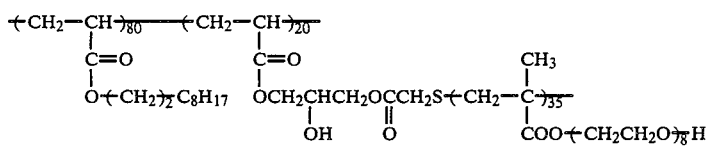

GP-2

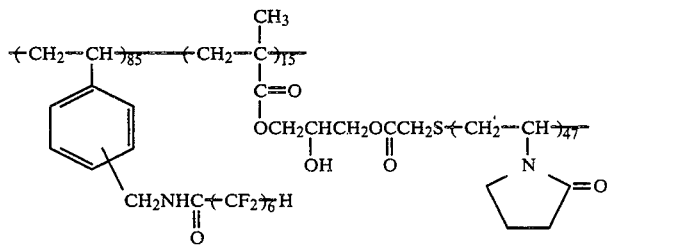

GP-3

GP-4
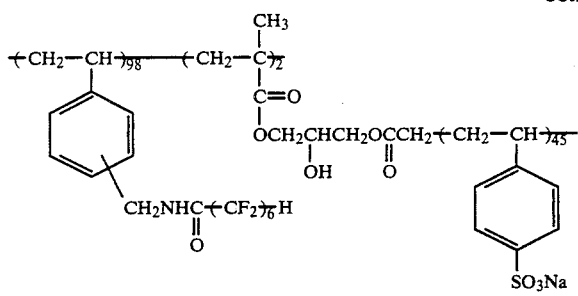
GP-5
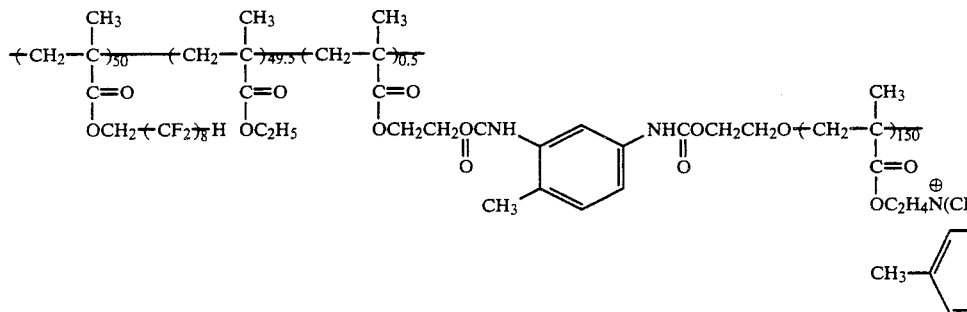
GP-6
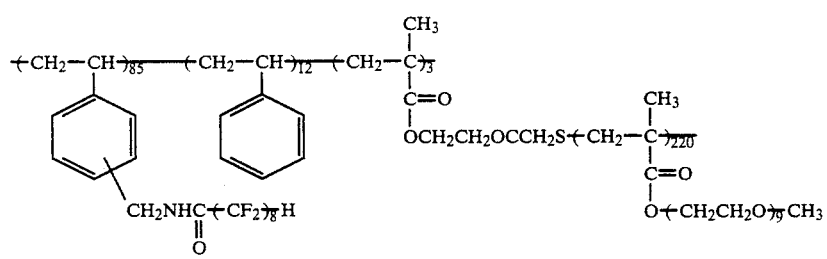
GP-7
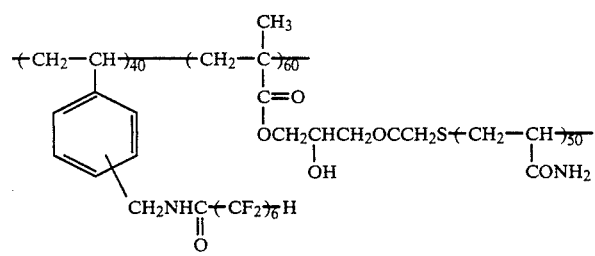
GP-8
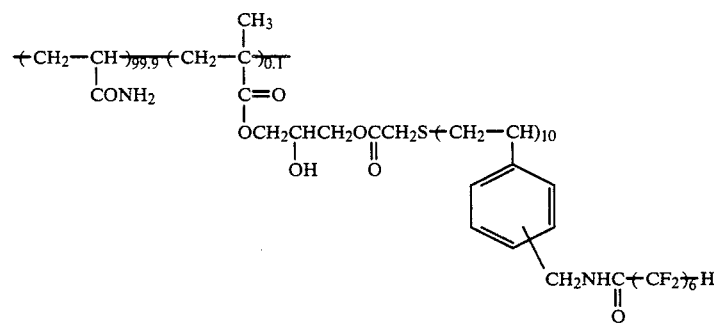
GP-9
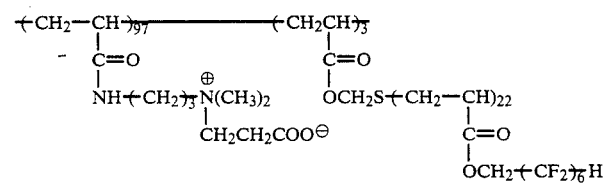

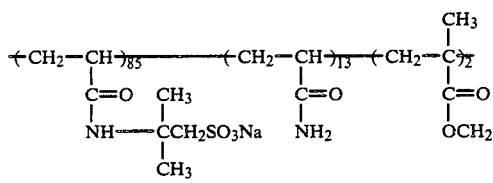
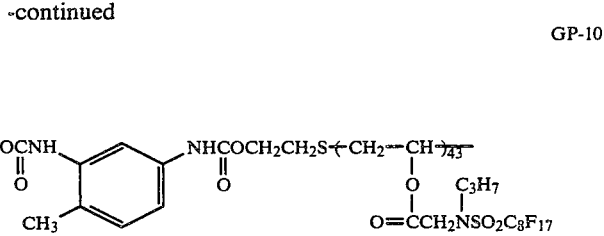

GP-10

GP-11

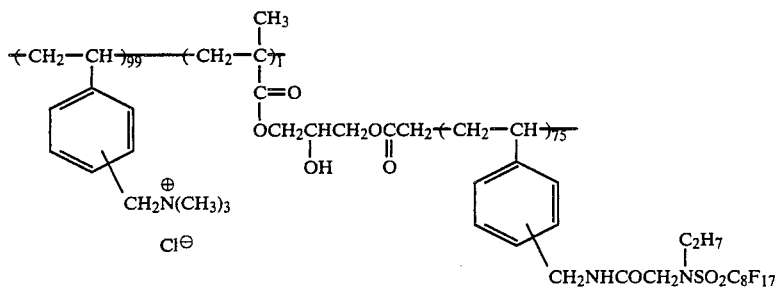

GP-12

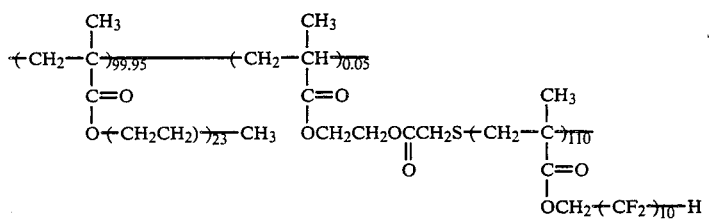

Synthesis examples for the fluorine-containing graft polymers according to the present invention are illustrated below.

SYNTHESIS EXAMPLE 1

Synthesis of F-Containing Graft Polymer GP-3

Synthesis of Macromonomer:

In a 1-liter three-necked flask equipped with a stirrer and a reflux condenser was charged 300 ml of distilled water, and heated to 90 to 95° C. in a nitrogen atmosphere. A solution of 200 g of an N-vinylpyrrolidone monomer, 1.68 g of azobiscyanovaleric acid, 3 g of thioglycolic acid and 1.89 g of sodium hydroxide in 100 ml of distilled water was added thereto while stirring at a constant rate over a period of 5 hours. The heating and stirring were continued for an additional 1.5 hour to effect polymerization. The thus produced N-vinylpyrrolidone polymer solution was added to distilled water to a final concentration of 10% by weight and then passed through a column of a cation-exchange resin, Amberlite 120 (produced by Rhomn & Haas), having been pretreated with an acid, to thereby remove sodium hydroxide. The water was removed by distillation to obtain 102 g of poly-N-vinylpyrrolidone having a terminal carboxyl group and having a number average molecular weight of 5,200 as determined from vapor pressure depression (number average degree of polymerization=47).

A hundred grams of the poly-N-vinylpyrrolidone having a terminal hydroxyl group, 4.1 g of glycidyl methacrylate, a small amount (0.1 g) each of hydroquinone and N,N-dimethyl laurylamine, and 200 ml of ethanol were charged in a 500 ml-volume three-necked flask equipped with a stirrer and a reflux condenser, and the mixture was heated under stirring for 5 hours. The product was purified by reprecipitation and dried to obtain 85 g of a poly-N-vinylpyrrolidone macromonomer having the following formula:

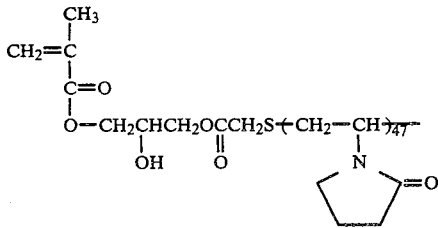

Synthesis of F-Containing Graft Polymer:

In a three-necked flask equipped with a stirrer and a reflux condenser were charged 25 g of Fluorine-Containing Monomer IV-4, 50 g of the poly-N-vinylpyrrolidone macromonomer and 500 ml of N,N-dimethylformamide, and the mixture was heated at 70° C. under a nitrogen atmosphere. Fifty-three milligrams of azobisisobutyronitrile were added thereto, and the mixture was heated under stirring for 5 hours to effect polymerization. To the polymerization system was further added 53 g of azobisisobutyronitrile, and heating under stirring was continued for an additional 2 hours to allow the mixture to sufficiently polymerize.

The produced polymer was purified by reprecipitation to obtain a fluorine-containing graft polymer GP-3.

SYNTHESIS EXAMPLE 2

Synthesis of F-Containing Graft Polymer GP-8

Synthesis of Macromonomer:

In the same manner as described in Synthesis Example 1, a fluorine-containing macromonomer having the following formula was synthesized.

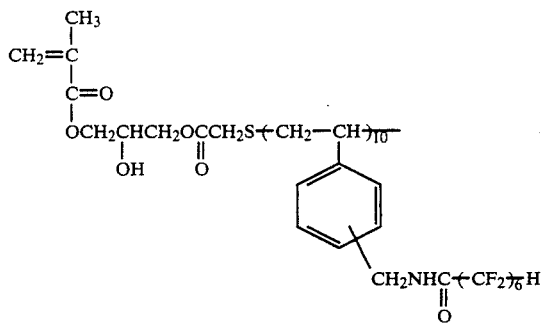

Synthesis of F-Containing Graft Polymer:

A fluorine-containing graft polymer, GP-8, was prepared in the same manner as described in Synthesis Example 1 except that an acrylamide monomer and the above-described fluorine-containing macromonomer were polymerized.

The graft polymers according to the present invention can be prepared by various processes. For example, the graft polymers can be prepared by a process comprising homopolymerizing a hydrophobic fluorine-containing monomer or copolymerizing said monomer with a third hydrophobic monomer by solution polymerization, emulsion polymerization, precipitation polymerization, suspension polymerization, bulk polymerization, and the like to prepare a linear polymer as a main chain component, and irradiating the linear polymer with radiation in the presence of a hydrophilic monomer to graft the hydrophilic monomer to the linear polymer, or a process comprising homopolymerizing a hydrophilic monomer or copolymerizing said hydrophilic monomer with a third hydrophobic monomer by any of the above-described polymerization methods to form a linear polymer as a main chain component, and irradiating the linear polymer with radiation in the presence of a hydrophobic fluorine-containing monomer to graft the hydrophobic monomer to the linear polymer. The method of graft-polymerization by irradiation is described, e.g., in Teiji Tsuruta, *Kobunshi Gosei Hanno*, 2nd Ed., 109–112, Nikkan Kogyo Shinbunsha (1977).

Other methods for synthesizing graft polymers are described in R. J. Ceresa (ed.), *Block and Graft Polymerization*, Vol. 1, 2–24, John Wiley & Sons (1973).

Among these methods, the so-called macromonomer process is preferred to prepare the graft polymers of the formulae (I) and (II).

The graft polymers represented by the formula (I) according to the present invention can be prepared by copolymerizing a hydrophobic fluorine-containing monomer $A^1$, a third hydrophobic monomer $B^1$, and a macromonomer derived from a hydrophilic monomer $D^1$ and represented by the formula (VII):

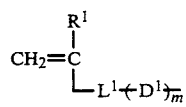
(VII)

wherein $R^1$, $L^1$, $D^1$ and m are as defined above.

The graft polymers represented by the formula (II) according to the present invention can be prepared by copolymerizing a hydrophilic monomer $D^2$, a third hydrophobic monomer, and a macromonomer derived from a hydrophobic fluorine-containing monomer $A^2$ and represented by the formula (VIII):

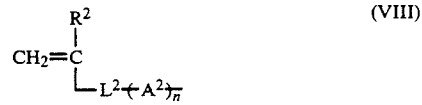
(VIII)

wherein $R^2$, $L^2$, $A^2$, and n are as defined above.

Production of graft polymers by a macromonomer process is described, e.g., in Yamashita et al., *Nippon Secchaku Kyokai-shi*, Vol. 17, 371–377 (1981), Yamashita et al., *Kobunshi*, Vol. 31, 988–992 (1982), British Pat. No. 1,096,912, U.S. Pat. No. 3,689,593, Yamashita et al., *Macromolecules*, Vol. 13, 216 (1980), Yamashita et al., *Polymer Journal*, Vol. 14, 255 (1982), etc.

The amount of the fluorine-containing graft polymer to be used in the present invention varies depending on the kind and structure of the photographic light-sensitive materials, the coating method employed in the production thereof, and the like, but usually ranges from 0.001 to 0.1 g per m$^2$, and preferably from 0.01 to 0.02 g per m$^2$, of the photographic light-sensitive material.

The graft polymer of the formula (I) or (II) in accordance with the present invention is dissolved in water, an organic solvent, e.g., methanol, ethanol, acetone, methyl ethyl ketone, ethyl acetate, acetonitrile, dioxane, dimethylformamide, formamide, dimethyl sulfoxide, methyl cellosolve, ethyl cellosolve, etc., or a mixture thereof, and the resulting solution is incorporated in a light-sensitive emulsion layer or an insensitive auxiliary layer, e.g., a backing layer, an antihalation layer, an intermediate layer, a protective layer, etc., or the solution is directly applied onto the surface of a light-sensitive material by spraying or coating or dipping the material in the solution, followed by drying.

The graft polymer of the present invention may be used as an independent antistatic layer in combination with a binder, such as gelatin, polyvinyl alcohol, cellulose acetate, cellulose acetate phthalate, polyvinyl formal, polyvinyl butyral and the like.

The layer containing the fluorine-containing graft polymer according to the present invention or other layers may contain other conventional antistatic agents to obtain a further enhanced effect to prevent static charge. Examples of such antistatic agents that can be used in combination include polymers disclosed in U.S. Pat. Nos. 2,882,157, 2,972,535, 3,062,785, 3,262,807, 3,514,291, 3,615,531, 3,753,716, 3,938,999, 4,070,189 and 4,147,550, German Pat. No. 2,800,466, Japanese Patent Application (OPI) Nos. 91165/73, 94433/73, 46733/74, 54672/75, 94053/75 and 129520/77, etc.; surface active agents disclosed in U.S. Pat. Nos. 2,982,651, 3,428,456, 3,457,076, 3,454,625, 3,552,972, and 3,655,387, etc.; metal oxides, colloidal silica, etc. disclosed in U.S. Pat. Nos. 3,062,700, 3,245,833 and 3,525,621, etc.; strontium barium sulfate; polymethyl methacrylate; a methyl methacrylate-methacrylic acid polymer; so-called matting agents comprising colloidal silica, powderous silica, etc.; and the like.

Layers to which the fluorine-containing graft polymer of this invention can be incorporated includes an emulsion layer, a subbing layer on the same side of an emulsion layer, an intermediate layer, a surface protective layer, an overcoat layer, a backing layer on the side opposite to an emulsion layer, and the like. Of these, outermost layers, such as a surface protective layer, an overcoat layer, a backing layer, etc., are particularly suitable.

Supports for the photographic light-sensitive materials to which the present invention is applicable include films made of polyolefins, e.g., polyethylene, polystyrene, cellulose derivatives, e.g., cellulose triacetate, polyesters, e.g., polyethylene terephthalate, or a like polymer, baryta paper, synthetic paper or paper having laminated the above-enumerated polymer film on both sides thereof, and the like.

The support may have an antihalation coating comprising carbon black, or various dyes, such as oxonol dyes, azo dyes, arylidene dyes, styryl dyes, anthraquinone dyes, merocyanine dyes, tri(or di)allylmethane dyes, and the like. Binders used for such an antihalation coating include cellulose mono- or diacetate, polyvinyl alcohol, polyvinyl butyral, polyvinyl acetal, polyvinyl formal, polymethacrylic esters, polyacrylic esters, polystyrene, a styrene/maleic anhydride copolymer, polyvinyl acetate, a vinyl acetate/maleic anhydride copolymer, a methyl vinyl ester/maleic anhydride copolymer, polyvinylidene chloride and derivatives of these polymers.

Light-sensitive materials to which the present invention can be applied include ordinary monochromatic silver halide light-sensitive materials (e.g., monochromatic light-sensitive materials for photographing, X-ray or printing, etc.), ordinary multilayer color light-sensitive materials (e.g., color reversal films, color negative films, color positive films, etc.), and a wide variety of other light-sensitive materials. The present invention exerts its effect particularly when applied to silver halide light-sensitive materials for high temperature and rapid processing and high sensitivity silver halide light-sensitive materials.

Photographic layers of the silver halide light-sensitive materials in accordance with the present invention will be briefly described below.

Binders which can be used in the photographic layers include proteins, such as gelatin, casein, etc.; cellulose compounds, such as carboxymethyl cellulose, etc.; sugar derivatives, e.g., agar, sodium alginate, starch derivatives, etc.; and synthetic hydrophilic colloids, such as polyvinyl alcohol, poly-N-vinylpyrrolidone, polyacrylic acid copolymers, polyacrylamide; and derivatives or partial hydrolysis products thereof.

The gelatin as recited above includes limeprocessed gelatin, acid-processed gelatin, and enzymeprocessed gelatin.

A part or the whole of the gelatin binder may be displaced by a synthetic high polymer, a gelatin derivative obtained by reacting gelatin with a reagent having a group capable of reacting with a functional group of the gelatin, i.e., an amino group, an imino group, a hydroxyl group or a carboxyl group, or a graft polymer of gelatin obtained by grafting a high polymer to gelatin.

There are no particular limitations to the kind of silver halides used in silver halide emulsion layers, surface protective layer, etc., the method of preparing silver halides, the method of chemical sensitization, the kinds of additives, such as antifoggants, stabilizers, hardeners, antistatic agents, plasticizers, lubricants, coating aids, matting agents, brightening agents, spectral sensitizing dyes, dyes and color couplers, etc. For details therefor, reference can be made to, e.g., *Product Licensing*, Vol. 92, 107–110 (December, 1971) and *Research Disclosure*, Vol. 176, 22–31 (1978).

More specifically, the antifoggants and stabilizers which can be used include a number of compounds, such as heterocyclic compounds, mercury-containing compounds, mercapto compounds and metal salts as exemplified by 4-hydroxy-6-methyl-1,3,3a,7-tetraazaindene-3-methylbenzothiazole and 1-phenyl-5-mercaptotetrazole. Examples of the hardeners which can be used are mucohalogenic acids, e.g., mucochloric acid, mucobromic acid, mucophenoxychloric acid, mucophenoxybromic acid, etc.; aldehyde compounds, e.g., formaldehyde, dimethylourea, trimethylolmelamine, glyoxal, monomethyl glyoxal, 2,3-dihydroxy-1,4-dioxane, 2,3-dihydroxy-5-methyl-1,4-dioxane, succinaldehyde, 2,5-dimethoxytetrahydrofuran, glutaraldehyde, etc.; active vinyl compounds, e.g., divinyl sulfone, methylenebismaleimide, 5-acetyl-1,3-diacryloyl-hexahydro-s-triazine, 1,3,5-triacryloyl-hexahydro-s-triazine, 1,3,5-trivinylsulfonyl-hexahydro-s-triazinebis(vinylsulfonylmethyl) ether, 1,3-bis(vinylsulfonylmethyl)-2-propanol, bis($\alpha$-vinylsulfonylacetamido)ethane, etc.; active halogen compounds, e.g., sodium 2,4-dichloro-6-hydroxy-s-triazine, 2,4-dichloro-6-methoxy-2-triazine, sodium 2,4-dichloro-6-(4-sulfoanilino)-s-triazine, 2,4-dichloro-6-(2-sulfoethylamino)-s-triazine, N,N'-bis(2-chloroethylcarbamyl)piperazine, etc.; epoxy compounds, e.g., bis(2,3-epoxypropyl)methylpropylammonium p-toluenesulfonate, 1,4-bis(2',3'-epoxypropyloxy)butane, 1,3,5-triglycidyl isocyanurate, 1,3-diglycidyl-5-($\gamma$-acetoxy-$\beta$-oxypropyl) isocyanurate, etc.; ethyleneimine compounds, e.g., 2,4,6-triethyleneimino-s-triazine, 1,6-hexamethylene-N,N'-bisethyleneurea, bis-$\beta$-ethyleneiminoethyl thioether, etc.; methanesulfonic ester compounds, e.g., 1,2-di(methanesulfonoxy)ethane, 1,4-di(methanesulfonoxy)butane, 1,5-di-(methanesulfonoxy)pentane, etc.; carbodiimide compounds; isoxazole compounds; and inorganic compounds, e.g., chromium alum, etc.

In the present invention, the photographic layers may contain a known surface active agent alone or in combination thereof. Examples of usable surface active agents include naturally-occurring surface active agents, e.g., saponin; nonionic surface active agents, e.g., alkylene oxides, glycerins, glycidols, etc.; cationic surface active agents, e.g., higher alkylamines, quaternary ammonium salts, pyridine and other heterocyclic compounds, phosphonium or sulfonium salts, etc.; anionic surface active agents containing acidic groups, e.g., a carboxyl group, a sulfo group, a phospho group, a sulfuric ester group, a phosphoric ester group, etc.; and amphoteric surface active agents, e.g., amino acids, aminosulfonic acids, sulfates or phosphates of amino alcohols, etc.

The photographic layers of the photographic light-sensitive materials can contain an alkyl acrylate type latex as disclosed in U.S. Pat. Nos. 3,411,911 and 3,411,912, Japanese Patent Publication No. 5331/70, etc.

The present invention will now be illustrated in greater detail with reference to examples, but it should be understood that these examples are not limiting the present invention.

EXAMPLE 1

(1) Preparation of Sample

Preparation of Silver Halide Emulsion:

Silver iodobromide grains (silver iodide content: 1.5 mol %; mean grain size: 1.35 $\mu$m) were produced in the presence of ammonia according to a double jet method, and the resulting emulsion was chemically sensitized using chloroauric acid and sodium thiosulfate. After completion of the chemical sensitization, an antifoggant (1-phenyl-5-mercaptotetrazole), a stabilizer (4-hydroxy-6-methyl-1,3,3a,7-tetraazaindene) and a coating aid were added thereto to obtain a coating solution for an emulsion layer. The coating solution had a specific gravity of 1.12 and a weight ratio of silver/gelatin of 1.55.

Preparation of Coating Solution for Surface Protective Layer:

A 10% aqueous gelatin solution was prepared from 100 g of solid gelatin, 0.06 g of sodium polystyrene sulfonate, 2.2 g of a polymethyl methacrylate dispersion (mean particle size: 3.0 μm), 0.84 g of sodium t-octyl-phenoxyethoxyethoxyethanesulfonate, and 0.62 g of N,N'-ethylenebis(vinylsulfonylacetamide).

Onto both sides of a 180 μm thick polyethylene terephthalate film support having provided thereon a subbing layer, the above-described silver halide emulsion and a coating solution for a protective layer were coated in this order by co-extrusion and dried.

The resulting sample had a silver coverage of 4.0 g/m$^2$ and a gelatin coverage in the surface protective layer of 1.1 g/m$^2$ in each of both sides thereof.

The fluorine-containing polymer according to the present invention or a comparative fluorinecontaining polymer was added to the coating solution for a surface protective layer.

(2) Test Method

Determination of Static Voltage:

The sample thus obtained was cut into a size of 30 cm×40 cm, conditioned at 25° C. and 25% RH for 5 hours, and passed through a pair of rotating rollers made of white Neoprene rubber (roller diameter: 12 cm; roller width: 1 cm; pressure between rollers: 6 Kg/cm$^2$). The sample was then placed in a Faraday's cage, and determined for charged voltage by means of an electrometer.

Determination of Photographic Properties:

The above-prepared sample was interposed between a pair of radiographic intensifying screens (Hi-Standard screens produced by Fuji Photo Film Co., Ltd.; calcium tungstate is used as a fluorescent substance) and irradiated with X-rays for 1/20 second through an aluminum foil. The sample was development-processed by means of an automatic developing machine of roller-carrying type (Fuji RU, produced by Fuji Photo Film Co., Ltd.), in which the sample was developed with a developing solution having the following formulation at 35° C. for 25 seconds, fixed at 35° C. for 25 seconds, washed at 33° C. for 25 seconds and dried at 45° C., and then subject to sensitometry.

| Formulation of Developing Solution | |
|---|---|
| Potassium hydroxide | 29.14 g |
| Glacial acetic acid | 10.96 g |
| Potassium sulfite | 44.20 g |
| Sodium hydrogencarbonate | 7.50 g |
| Boric acid | 1.00 g |
| Diethylene glycol | 28.96 g |
| Ethylenediaminetetraacetic acid | 1.67 g |
| 5-Methylbenzotriazole | 0.06 g |
| 5-Nitroindazole | 0.25 g |
| Hydroquinone | 30.00 g |
| 1-Phenyl-3-pyrazolidone | 1.50 g |
| Glutaraldehyde | 4.93 g |
| Sodium metabisulfite | 12.60 g |
| Potassium bromide | 6.00 g |
| Water to make | 1 liter |
| | (pH = 10.25) |

Determination of Adhesion Resistance:

The above-described sample was cut into a size of 4 cm×4 cm and conditioned at 25° C. and 70% RH for 2 days. Two sample films were superposed and allowed to stand at 50° C. and 70% RH for 1 day under a load of 1,500 g. Thereafter, the two films were peeled away, and the surface area wherein two films had been adhered to each other was measured. Evaluation of adhesion resistance was in accordance with the following scales:

| Rank | Adhered Surface Area (%) |
|---|---|
| A | 0–40 |
| B | 41–60 |
| C | 61–80 |
| D | 81–100 |

(3) Test Results

The results obtained are shown in Table 1 below.

TABLE 1

| Sample No. | Antistatic Agent | Coverage of Antistatic Agent on Each Side (mg/m$^2$) | Charged Voltage (V) | Photographic Properties (Relative Value) | | | Adhesion Resistance |
|---|---|---|---|---|---|---|---|
| | | | | Fog | Sensitivity | Maximum Density | |
| 1 (blank) | — | — | +410 | 0.15 | 100 | 2.8 | C |
| 2 (Invention) | GP-1 | 0.5 | +230 | " | " | " | B |
| 3 (Invention) | " | 1 | +70 | " | " | " | B |
| 4 (Invention) | " | 2 | 0 | " | 99 | " | A |
| 5 (Invention) | GP-3 | 0.5 | +300 | " | 100 | " | B |
| 6 (Invention) | " | 1 | +100 | " | " | " | A |
| 7 (Invention) | " | 2 | +10 | " | " | " | A |
| 8 (Invention) | GP-4 | 3 | 0 | " | 99 | " | B |
| 9 (Invention) | GP-8 | 1.5 | −10 | " | 100 | " | A |
| 10 (Invention) | GP-9 | 2 | 0 | " | " | " | B |
| 11 (Comparison) | Polymer-1* | 2 | +190 | 0.16 | 97 | 2.8 | C |
| 12 (Comparison) | " | 4 | +80 | 0.17 | 95 | 2.6 | C |
| 13 (Comparison) | " | 8 | −10 | 0.18 | 93 | 2.5 | B |
| 14 (Comparison) | Polymer-2* | 4 | +130 | 0.17 | 98 | 2.8 | C |
| 15 (Comparison) | " | 8 | +60 | 0.19 | 97 | " | C |

TABLE 1-continued

| Sample No. | Antistatic Agent | Coverage of Antistatic Agent on Each Side (mg/m²) | Charged Voltage (V) | Photographic Properties (Relative Value) | | | Adhesion Resistance |
|---|---|---|---|---|---|---|---|
| | | | | Fog | Sensitivity | Maximum Density | |
| 16 (Comparison) | " | 12 | +10 | 0.20 | 95 | " | B |

Note:
Polymer-1*: Polymer P-1 of the following formula described in British Patent 2,080,559:

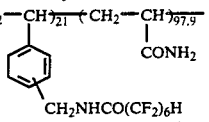
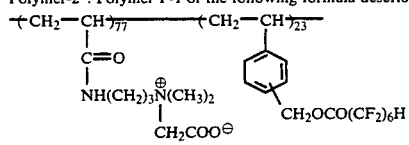

Polymer-2*: Polymer P-1 of the following formula described in U.S. Pat. No. 4,362,812:

As is apparent from Table 1, the electric charge of the sample containing no antistatic agent (Sample No. 1) was great, while generation of static electricity was not substantially observed in Sample Nos. 4 and 7 to 10 which contained an adequate amount (i.e., 1.5 to 3 mg/m²) of the fluorine-containing graft polymer according to the present invention. Generation of static electricity was also suppressed in the comparative samples containing Polymer-1 and 2, but it can be seen that these conventional polymers should be added in greater quantities (i.e., 8 mg/m² in Sample No. 13; 12 mg/m² in Sample No. 16) to achieve comparative antistatic effect as compared with the graft polymers of the present invention. Further, incorporation of the graft polymers of the present invention does not bring about any adverse influences on the photographic properties, whereas incorporation of the comparative polymers induces on increase of fog, decrease of sensitivity and decrease of maximum density. In particular, it can be seen that addition of the comparative polymers in amounts enough to prevent static charge substantially to zero results in deleterious influences on the photographic properties. With respect to adhesion resistance, a conspicuous improvement can be observed in the samples containing the graft polymers of this invention over Sample No. 1 containing no antistatic agent. On the other hand, incorporation of the comparative polymers tends to improve adhesion resistance but to a very slight extent.

While the invention has been described in detail and with reference to specific embodiments thereof, it will be apparent to one skilled in the art that various changes and modifications can be made therein without departing from the spirit and scope thereof.

What is claimed is:

1. A photographic light-sensitive material wherein at least one of the constituting layers contains a fluorine-containing graft polymer derived from a polymerizable hydrophobic fluorine-containing monomer containing at least one fluorine atom and a polymerizable hydrophilic monomer, wherein said fluorine-containing graft polymer comprises (1) a hydrophobic fluorine-containing polymer chain as a main component grafted to a hydrophilic polymer chain as a branch component through a divalent linking group, or (2) a hydrophilic polymer chain as a main component grafted to a hydrophobic fluorine-containing polymer chain as a branch component through a divalent linking group, wherein said fluorine-containing graft polymer is represented by formula (I) below:

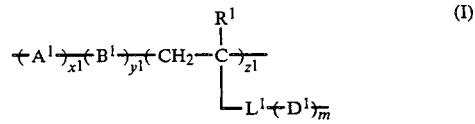

wherein $A^1$ represents a polymer chain formed by polymerizing a polymerizable hydrophobic fluorine-containing monomer having at least one fluorine atom and at least one ethylenically unsaturated group; $B^1$ represents a polymer chain formed by polymerizing a polymerizable hydrophobic monomer having no fluorine atom and having at least one ethylenically unsaturated group; $D^1$ represents a polymer chain formed by polymerizing a polymerizable hydrophilic monomer having at least one ethylenically unsaturated group; $L^1$ represents a divalent linking group; $R^1$ represents a hydrogen atom or an alkyl group having from 1 to 3 carbon atoms; m represents an average degree of polymerization of the hydrophilic monomer $D^1$ and ranges from 2 to about 1,000; and $x^1$, $y^1$ and $z^1$ represent percent ratios of copolymerization and range from 10 to 99.9 mol %, 0 to 50 mol %, and from 0.1 to 80 mol %, respectively or by formula (II) below:

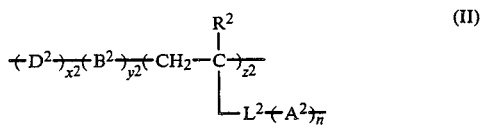

wherein $A^2$ represents a polymer chain formed by polymerizing a polymerizable hydrophobic fluorine-containing monomer having at least one fluorine atom and at least one ethylenically unsaturated group; $B^2$ represents a polymer chain formed by polymerizing a polymerizable hydrophobic monomer having no fluorine atom and at least one ethylenically unsaturated group; $D^2$ represents a polymer chain formed by polymerizing a polymerizable hydrophilic monomer having at least one ethylenically unsaturated group; $L^2$ represents a divalent linking group; $R^2$ represents a hydrogen atom or an alkyl group having from 1 to 3 carbon atoms; n represents an average degree of polymerization of a hydrophobic fluorine-containing monomer $A^2$ and ranges from 2 to about 1,000; and $x^2$, $y^2$ and $z^2$ represent percent ratios of copolymerization and range from 30 to 99.99 mol %, 0 to 50 mol %, and from 0.01 to 20 mol %, respectively.

2. A photographic light-sensitive material as claimed in claim 1, wherein said fluorine-containing graft polymer further contains a third polymerizable hydrophobic polymer chain containing no fluorine atom.

3. A photographic light-sensitive material as claimed in claim 1, wherein, said fluorine-containing graft polymer comprises a polymer chain formed by polymerizing a polymerizable hydrophobic fluorine-containing monomer containing at least one fluorine atom as a main chain component and a polymer chain formed by polymerizing a polymerizable hydrophilic monomer as a branch component.

4. A photographic light-sensitive material as claimed in claim 2, wherein said fluorine-containing graft polymer comprising a polymer chain formed by polymerizing a polymerizable hydrophobic fluorine-containing monomer containing at least one fluorine atom as a main chain component, a polymer chain formed by polymerizing a polymerizable hydrophilic monomer as a branch component and a third polymer chain formed by polymerizing a polymerizable hydrophobic monomer containing no fluorine atom as a main chain component or a branch component.

5. A photographic light-sensitive material as claimed in claim 1, wherein said fluorine-containing graft polymer comprises a polymer chain formed by polymerizing a polymerizable hydrophilic monomer as a main chain component and a polymer chain formed by polymerizing a polymerizable hydrophobic fluorine-containing monomer containing at least one fluorine atom as a branch component.

6. A photographic light-sensitive material as claimed in claim 2, wherein said fluorine-containing graft polymer comprises a polymer chain formed by polymerizing a polymerizable hydrophilic monomer as a main chain component, a polymer chain formed by polymerizing a polymerizable hydrophobic fluorine-containing monomer containing at least one fluorine atom as a branch component, and a third polymer chain formed by polymerizing a polymerizable hydrophobic monomer containing no fluorine atom as a main chain component or a branch component.

7. A photographic light-sensitive material as claimed in claim 7, wherein the polymerizable hydrophobic monomer containing at least one fluorine atom and at least one ethylenically unsaturated group as represented by $A^1$ and $A^2$ is represented by the formula (III), (IV), (V) or (VI):

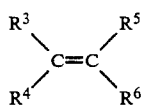
(III)

wherein $R^3$, $R^4$, $R^5$ and $R^6$, which may be the same or different, each represents a hydrogen atom, a fluorine atom, a chlorine atom, an alkyl group having from 1 to 3 carbon atoms, a $-(CF_2)_p F$ group, wherein p is an integer of from 1 to 10, a $-O-(CF_2)_p F$ group, wherein p is an integer of from 2 to 10, wherein p is an integer of from 2 to 10, a $-OCH_2-(CF_2)_p H$, wherein p is an integer of from 2 to 10, $-O-(CH_2)_p H$, wherein p is an integer of from 2 to 10, $-O-(CF_2)_p OC_6F_5$, wherein p is an integer of from 2 to 4, or a $-CF=CF_2$ group, with proviso that at least one of $R^3$, $R^4$, $R^5$, $R^6$ contains at least one fluorine atom;

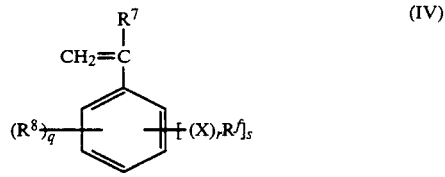
(IV)

wherein $R^7$ represents a hydrogen atom, a chlorine atom or an alkyl group having from 1 to 3 carbon atoms; $R^8$ represents a monovalent substituent, or a plurality of $R^8$ may be taken together to form a ring; $R^f$ represents an alkyl, aralkyl, aryl or alkylaryl group having from 1 to 30 carbon atoms, at least one hydrogen atom of which is substituted by a fluorine atom; X represents a divalent linking group represented by the formula $-(R)_t L^{3-}$ or $-L^3 R-$, wherein R represents an alkylene, arylene or aralkylene group having from 1 to 10 carbon atoms, $-L^3-$ represents $-O-$, $-S-$, $-NH-$, $-CO-$, $-OCO-$, $-SCO-$, $-CONH-$, $-S_2-$, $-NR^9SO_2-$, wherein R9 represents a hydrogen atom or an alkyl group having from 1 to 4 carbon atoms, $-SO_2-NH-$, $-SO-$ or $-OPO_2$, and t represents 0 or 1; q represents 0 or an integer of from 1 to 4; r represents 0 or an integer of from 1 to 4; and s represents an integer of from 1 to 5.

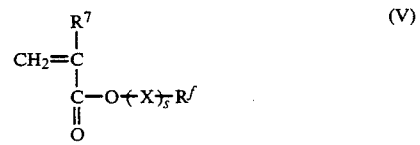
(V)

wherein $R^7$, X, $R^f$ and s are as defined above

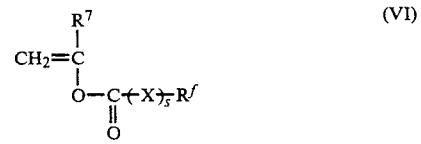
(VI)

wherein $R^7$, X, $R^f$ and s are as defined above.

8. A photographic light-sensitive material as claimed in claim 1, wherein the polymerizable hydrophobic monomer containing at least one fluorine atom and at least one ethylenically unsaturated group as represented by $A^2$ is represented by the formula (III), (IV), (V) or (VI):

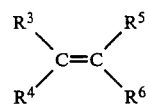
(III)

wherein $R^3$, $R^4$, $R^5$ and $R^6$, which may be the same or different, each represents a hydrogen atom, a fluorine atom, a chlorine atom, an alkyl group having from 1 to 3 carbon atoms, a $-(CF_2)_p F$ group, wherein p is an integer of from 1 to 10, a $-(OCF_2)_p F$ group, wherein p is an integer of from 2 to 10, $-OCH_2-(CF_2)_p H$, wherein p is an integer of from 2 to 10, $-O-CH_2-)_p H$, wherein p is an integer of from 2 to 10, —O—(CF$_2$)$_p$OC$_6$F$_5$, wherein p is an integer of from 2 to 4, or a —CF=CF$_2$ group, with proviso that at least one of R$^3$, R$^4$, R$^5$ and R$^6$ contains at least one fluorine atom;

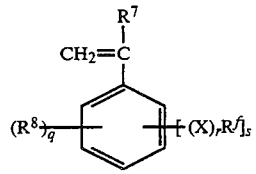

wherein R$^7$ represents a hydrogen atom, a chlorine atom or an alkyl group having from 1 to 3 carbon atoms; R$^8$ represents a monovalent substituent, or a plurality of R$^8$ may be taken together to form a ring; R$^f$ represents an alkyl, aralkyl, aryl or alkylaryl group having from 1 to 30 carbon atoms, at least one hydrogen atom of which is substituted by a fluorine atom; X represents a divalent linking group represented by the formula —(R)$_t$L$^3$— or —L$^3$(R)$_t$—, wherein R represents an alkylene, arylene or aralkylene group having from 1 to 10 carbon atoms, -L$^3$— represents —O—, —S—, —NH—, —CO—, —OCO—, —SCO—, —CONH—, —SO$_2$—, —NR$^9$SO$_2$—, wherein R$^9$ represents a hydrogen atom or an alkyl group having from 1 to 4 carbon atoms, —SO$_2$—NH—, —SO— or —OPO$_2$—, and t represents 0 or 1; q represents 0 or an integer of from 1 to 4; r represents 0 or an integer of from 1 to 4; and s represents an integer of from 1 to 5.

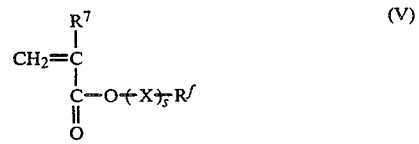

wherein R$^7$, X, R$^f$ and s are as defined above

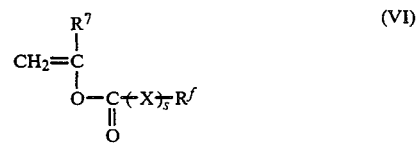

wherein R$^7$, X, R$^f$ and s are as defined above.

9. A photographic light-sensitive material as claimed in claim 1, wherein the fluorine-containing graft polymer is present in an amount of from 0.001 to 0.1 g per m$^2$ of the photographic light-sensitive material.

10. A photographic light-sensitive material as claimed in claim 9, wherein the fluorine-containing graft polymer is present in an amount of from 0.001 to 0.02 g per m$^2$ of the photographic light-sensitive material.

11. A photographic light-sensitive material as claimed in claim 2, wherein the fluorine-containing graft polymer is present in an amount of from 0.001 to 0.1 g per m$^2$ of the photographic light-sensitive material.

12. A photographic light-sensitive material as claimed in claim 11, wherein the fluorine-containing graft polymer is present in an amount of from 0.001 to 0.02 g per m$^2$ of the photographic light-sensitive material.

* * * * *